United States Patent [19]
Hachiya et al.

[11] Patent Number: 5,650,093
[45] Date of Patent: Jul. 22, 1997

[54] LIQUID CRYSTAL COMPOSITION AND A LC DISPLAY DEVICE

[75] Inventors: Norihisa Hachiya; Etsuo Nakagawa; Toyoshiro Isoyama; Tetsuya Matsushita, all of Chibaken, Japan

[73] Assignee: Chisso Corporation, Osaka, Japan

[21] Appl. No.: 583,743

[22] Filed: Jan. 17, 1996

[30] Foreign Application Priority Data

Jan. 19, 1995  [JP]  Japan .................................. 7-026110

[51] Int. Cl.⁶ .............................. C09K 19/30; C09K 19/12
[52] U.S. Cl. ................................ 252/299.63; 252/299.66
[58] Field of Search .............................. 252/299.63, 299.66

[56] References Cited

U.S. PATENT DOCUMENTS

| | | | |
|---|---|---|---|
| 4,522,741 | 6/1985 | Inoue et al. | 252/299.63 |
| 4,617,141 | 10/1986 | Inoue et al. | 252/299.63 |
| 5,030,383 | 7/1991 | Scheuble et al. | 252/299.61 |
| 5,308,538 | 5/1994 | Weber et al. | 252/299.61 |
| 5,324,449 | 6/1994 | Kurmeier et al. | 252/299.01 |
| 5,384,065 | 1/1995 | Geelhaar et al. | 252/299.63 |
| 5,389,289 | 2/1995 | Rieger et al. | 252/299.01 |
| 5,439,613 | 8/1995 | Takeshita et al. | 252/299.63 |
| 5,480,581 | 1/1996 | Plach et al. | 252/299.63 |

FOREIGN PATENT DOCUMENTS

WO92/04422  3/1992  WIPO .

*Primary Examiner*—C. H. Kelly
*Attorney, Agent, or Firm*—Wenderoth, Lind & Ponack

[57] ABSTRACT

A LC composition for AM-LCD having a high clearing point is provided by a composition comprising a first component containing a compound(s) of formula (1) and a second component containing at least one compound expressed by any of formulas (2), (3) and (4):

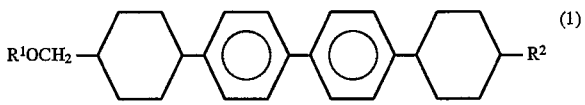

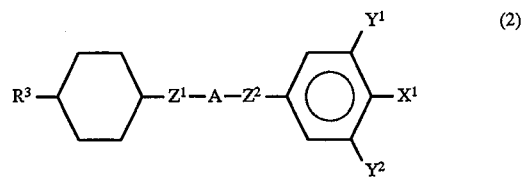

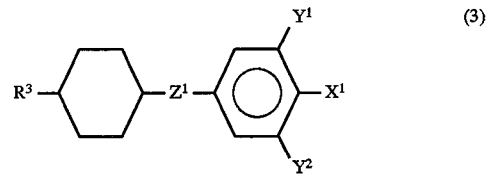

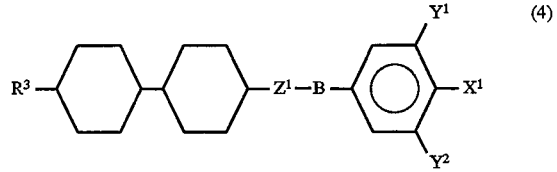

wherein $R^1$, $R^2$ and $R^3$ represent $C_{1-10}$ alkyl; $X^1$ represents F or Cl; $Y^1$ and $Y^2$ represent H or F; $Z^1$ and $Z^2$ represent —$CH_2CH_2$—, —COO— or a single bond; and A and B represent 1,4-phenylene or trans-1,4-cyclohexylene.

17 Claims, No Drawings

LIQUID CRYSTAL COMPOSITION AND A LC DISPLAY DEVICE

BACKGROUND OF THE INVENTION

1. Field of the Invention

The present invention relates to a liquid crystal composition and to a LC display device employing the composition. The invention relates more specifically to a LC composition which is preferably used in an active matrix mode display device.

2. Description of the Related Art

Liquid crystal display devices (LCDs) have been used hand-held electronic calculators, digital watches, and so forth, because of a lower driving voltage and smaller electric consumption in comparison with a Brown tube (CRT), and because of probability of miniaturization and reduction in weight and thickness. They have been leading flat-shaped displays. Answering recent necessity for computerization, LCDs have been applied widely to ① a personal computer, ② a video camera and a TV, and ③ displays for a motorcar and for outdoor-use. An active matrix addressed LCD (AM-LCD) using thin film transistors (TFT) is expected as a final winner among various LC display modes, since the AM-LCD is believed to enable very fine display (having high contrast) in color. The active matrix addressed display mode employs a TN display mode in which liquid crystal molecules are twisted by 90 degrees to be aligned on each of inner surfaces of a pair of substrates.

A liquid crystal material for display should so properly be selected as to satisfy various characteristics required for an intended use. For example, a liquid crystal material for the above-mentioned ③ displays for a motorcar or for outdoor-use is required to be adaptable to temperature change since the display is used under the environment in which temperature varies greatly. This means that the liquid crystal material is required to exhibit a nematic phase in a widest possible temperature range including a room temperature and a high clearing point particularly, in this case. At present, there has been found no single compound which satisfies those conditions as mentioned above. Hence a number of liquid crystal compounds are mixed together or with non-liquid-crystalline compounds to prepare a liquid crystal composition having necessary characteristics to be applied to an intended use.

In order to extend a nematic range of a LC composition, there should be introduced thereto a liquid crystal compound which has a high clearing point and good miscibility with many other liquid crystal compounds. A LC compound having both a high clearing point and several six-membered rings in chemical structure is known to be employed in order to elevate a clearing point of a resulting composition, however, utility of the composition is limited in this case because there is an increase in viscosity of the composition and also a tendency toward a difficulty in the miscibility at low temperature range.

Further, an AM-LCD requires a LC composition having a so-called high reliability in order to maintain a high contrast in display, in which high reliability means both a high specific resistance of the material and a high voltage holding ratio of the device.

Japanese patent application laid-open No. 58-219137 discloses a liquid crystal composition consisting of 4-(trans-4-alkyloxymethylcyclohexyl)-4'-(trans-4-alkylcyclohexyl) biphenyl compounds and cyano compounds having a terminal CN group(s). However, a LC composition containing a compound having a terminal CN group has a defect of reducing a specific resistance thereof, i.e. decreasing a voltage holding ratio at use temperature. Hence, it is difficult to use the disclosed composition in an AM-LCD.

Although various attempts have been made to liquid crystal materials as described above, it is the present status of art that the LC materials are required to be improved in their various properties.

SUMMARY OF THE INVENTION

An object of the present invention is to provide a liquid crystal composition having a wide nematic range (a high clearing point) and various characteristics which are desired for AM-LCD materials.

The present invention in the first aspect resides in a liquid crystal composition comprising:

a first component consisting of at least one member selected from the group of compounds expressed by formula (1):

wherein $R^1$ and $R^2$ represent independently an alkyl group of 1 to 10 carbon atoms, and a second component consisting of one or more members selected from the group of compounds expressed by formula (2), formula (3) or formula (4):

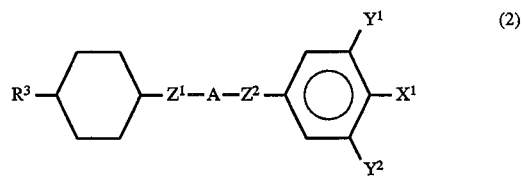

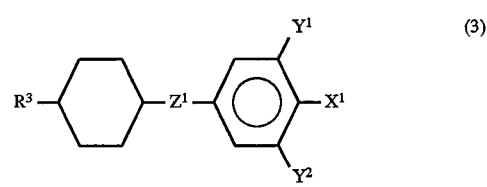

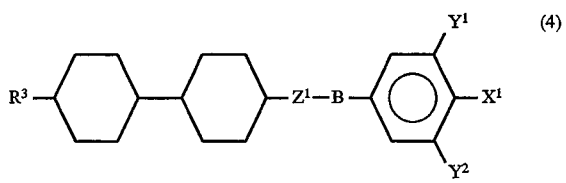

wherein $R^3$ represents an alkyl group of 1 to 10 carbon atoms; $X^1$ represents F or Cl; $Y^1$ and $Y^2$ represent independently H or F; $Z^1$ and $Z^2$ represent independently a single bond, —$CH_2CH_2$— or —COO—; A and B represent independently a trans-1,4-cyclohexylene or 1,4-phenylene.

An embodiment of the present invention resides in a liquid crystal composition as mentioned above, wherein the second component consists of one or more compounds expressed by formula (2).

Another embodiment of the present invention resides in a liquid crystal composition as mentioned above, wherein the second component consists of at least one compound expressed by formula (2) and at least one compound expressed by formula (3).

Still another embodiment of the invention resides in a liquid crystal composition as mentioned above, wherein the second component consists of at least one compound expressed by formula (2), at least one compound expressed by formula (3) and at least one compound expressed by formula (4).

Still another embodiment of the invention resides in a liquid crystal composition as mentioned above, wherein mixing proportions of the first and second components are 3–30% and 50–97%, respectively, based upon the total weight of the composition.

Furthermore, another embodiment of the present invention resides in a liquid crystal composition as mentioned above, further comprising a third component consisting of one or more members selected from the group of compounds expressed by formula (5), formula (6) or formula (7):

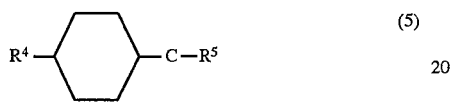  (5)

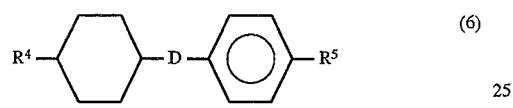  (6)

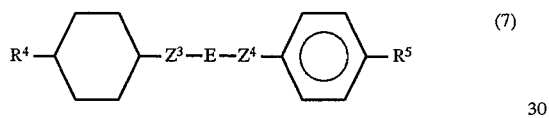  (7)

wherein $R^4$ and $R^5$ represent independently an alkyl group, an alkoxy group or an oxalykyl group each having 1 to 10 carbon atoms; $Z^3$ represents —CH$_2$CH$_2$— or a single bond; $Z^4$ represents —CH=CH— or —C≡C—; E represents 1,4-phenylene in which one hydrogen atom on any of the lateral positions may be replaced by F; and C and D represent trans-1,4-cyclohexylene or 1,4-phenylene.

Another embodiment of the present invention resides in a liquid crystal composition as described precedingly, wherein mixing proportions of the first, second and third components are 3–30%, 50–97% and up to 40%, respectively, based upon the total weight of the composition.

The present invention in the second aspect resides in a liquid crystal display device comprising a liquid crystal composition as mentioned in any of the above items, or in an AM-LCD comprising the same composition.

DETAILED DESCRIPTION OF THE PREFERRED EMBODIMENTS

Liquid crystal compounds of each of the components of the present composition will be mentioned herein below.

Compounds expressed by each of formulas (1) through (7) are known by a skilled person and are available.

A compound expressed by the aforementioned general formula (1) has a good physical and chemical stability. In the present invention, a compound of formula (1) plays, as one of liquid crystal materials having good miscibility with other LC compounds at low temperature, an important role of extending a nematic range of a resulting composition. Among the compounds of formula (1), those of formula (1) wherein $R^1$ represents a methyl group are particularly preferred in the present invention.

As compounds expressed by each of general formulas (2) through (4), those represented by each of the following general formulas are preferably used in the present invention.

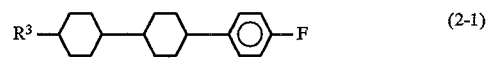 (2-1)

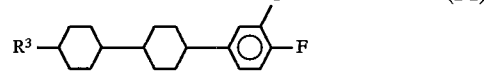 (2-2)

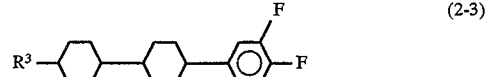 (2-3)

 (2-4)

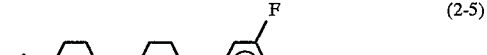 (2-5)

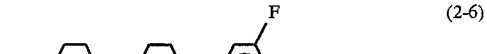 (2-6)

 (2-7)

 (2-8)

 (2-9)

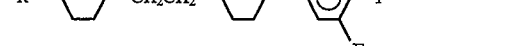 (2-10)

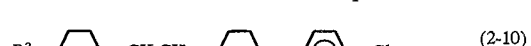 (2-11)

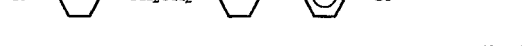 (2-12)

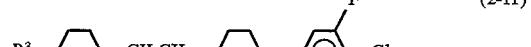 (2-13)

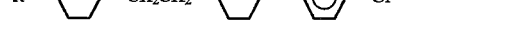 (2-14)

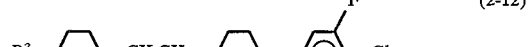 (2-15)

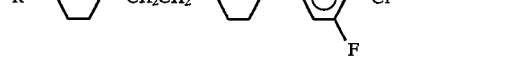 (2-16)

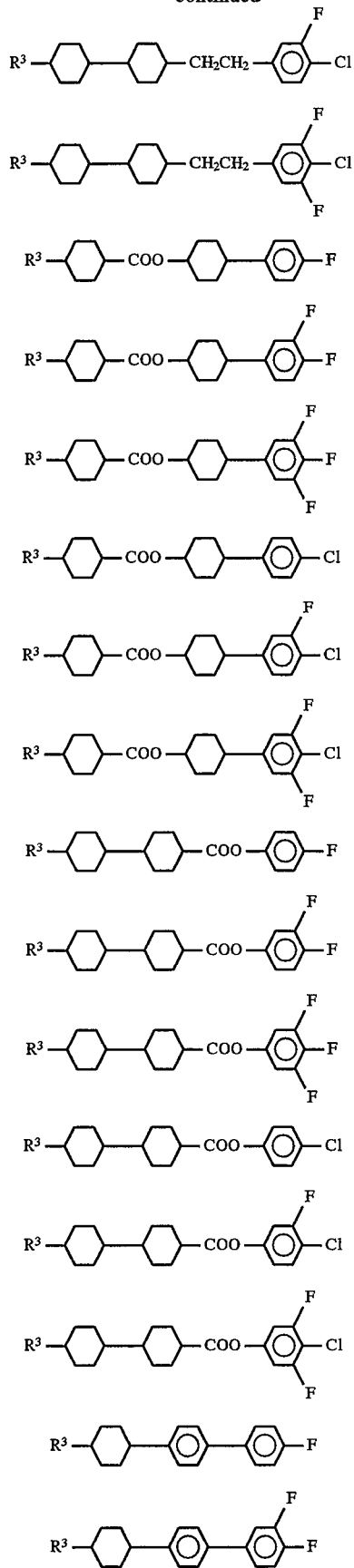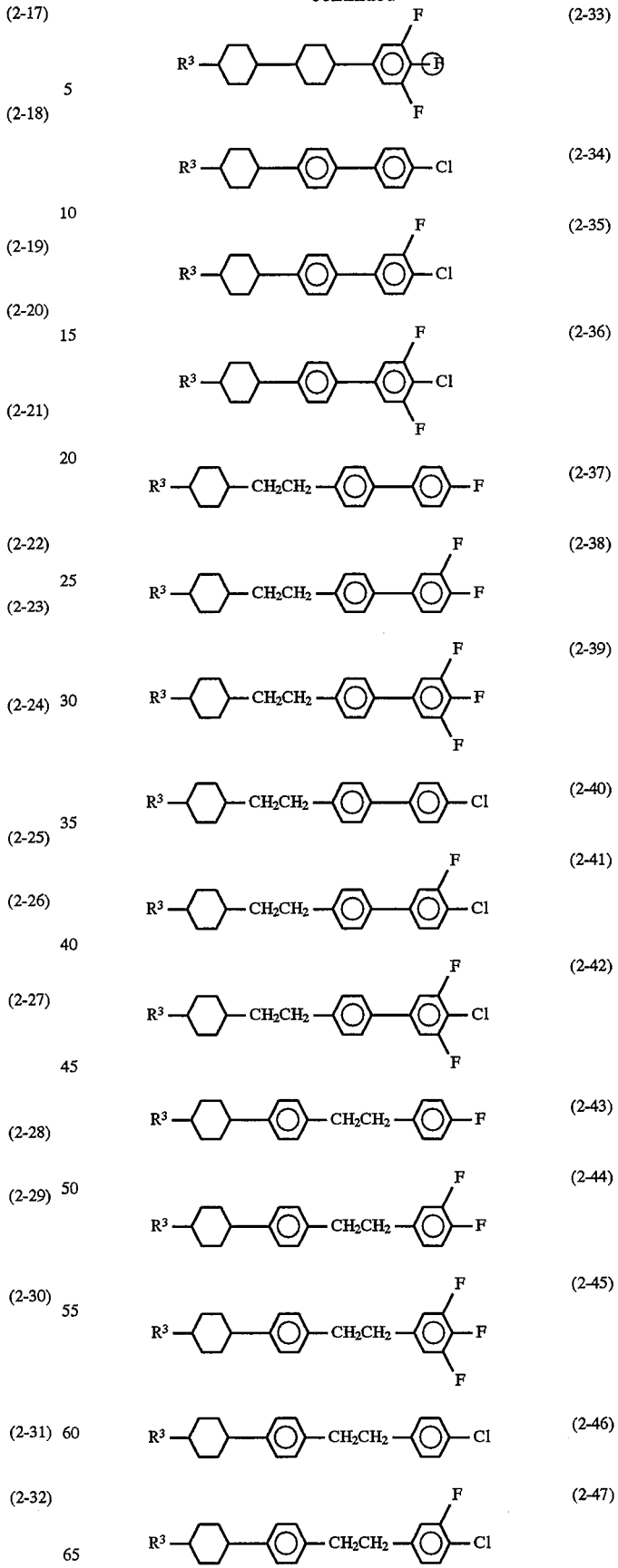

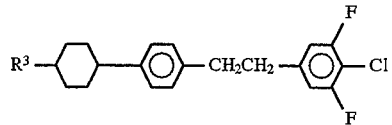 (2-48)
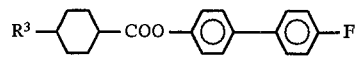 (2-49)
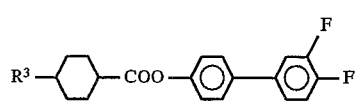 (2-50)
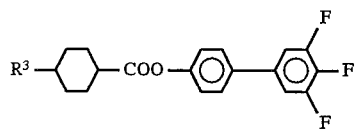 (2-51)
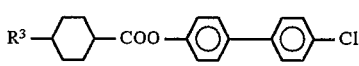 (2-52)
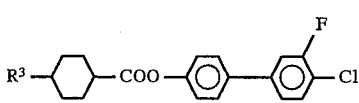 (2-53)
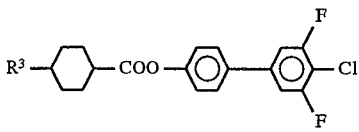 (2-54)
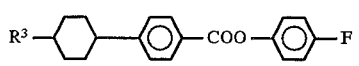 (2-55)
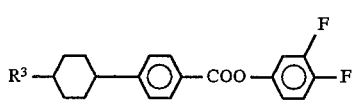 (2-56)
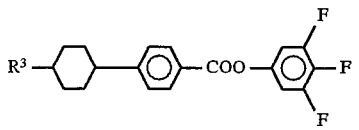 (2-57)
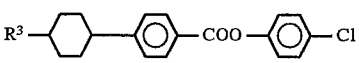 (2-58)
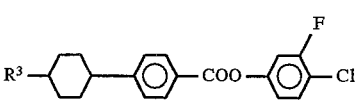 (2-59)
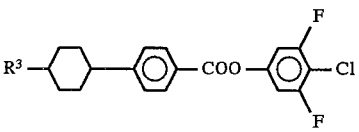 (2-60)
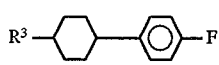 (3-1)
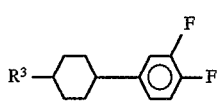 (3-2)
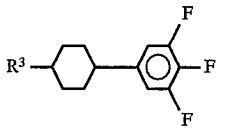 (3-3)
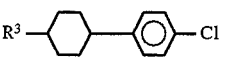 (3-4)
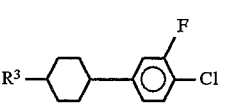 (3-5)
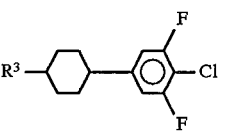 (3-6)
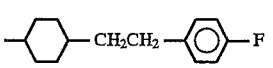 (3-7)
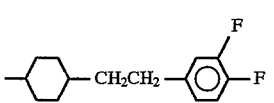 (3-8)
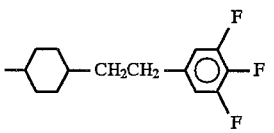 (3-9)
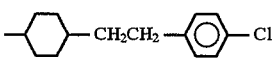 (3-10)
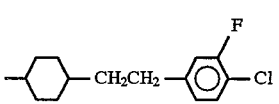 (3-11)
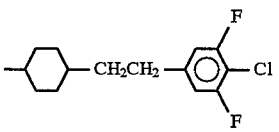 (3-12)
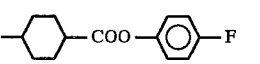 (3-13)
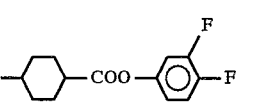 (3-14)
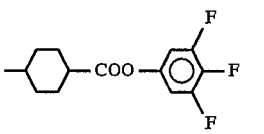 (3-15)
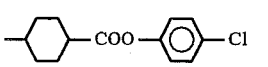 (3-16)
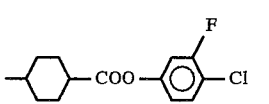 (3-17)

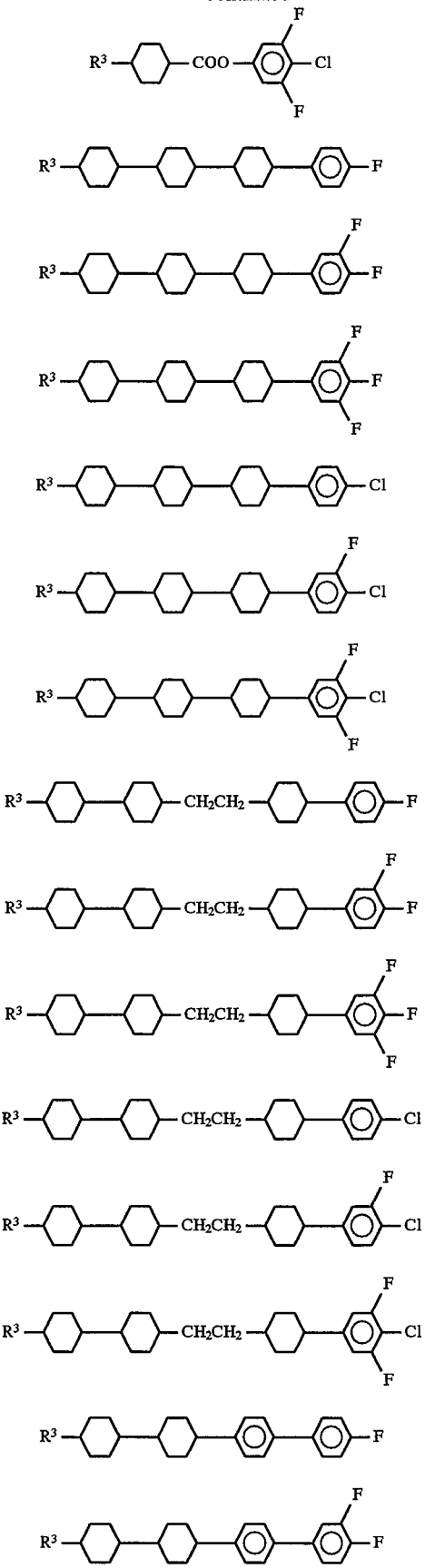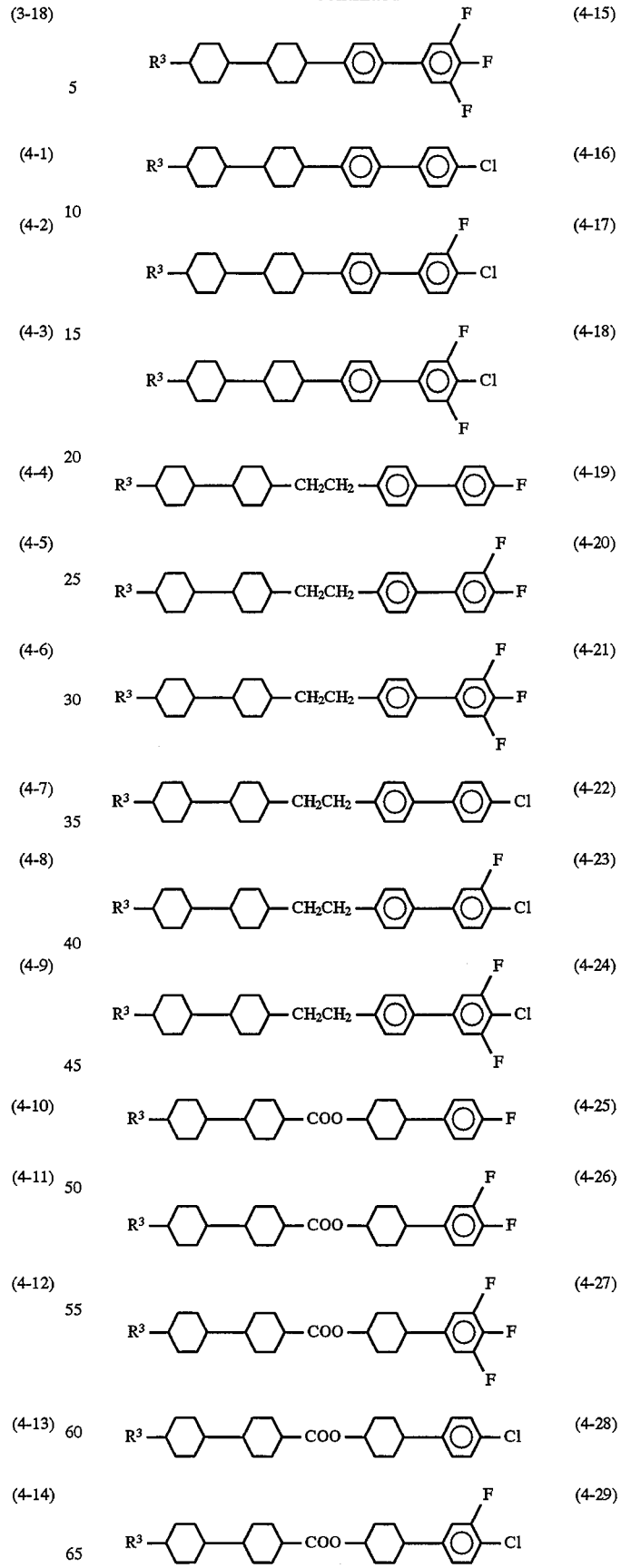

-continued

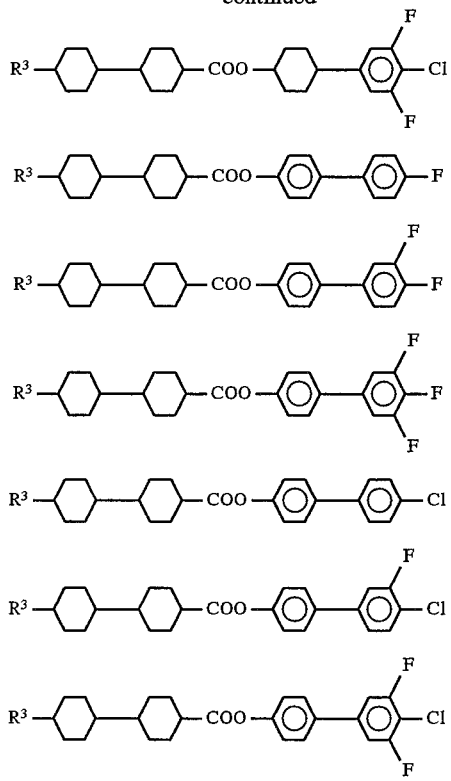

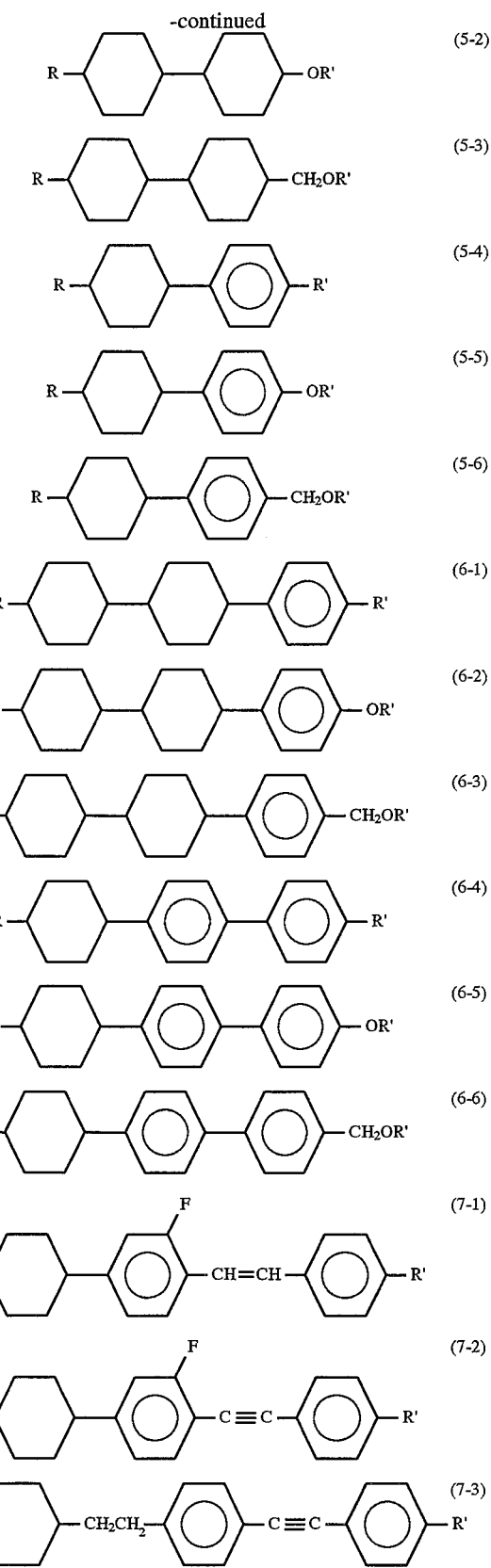

In these formulas R³ represents an alkyl group of 1 to 10 carbon atoms. Amongst those compounds, compounds expressed by each of above formulas (2-1), (2-2), (2-3), (2-4), (2-8), (2-9), (2-11), (2-15), (2-25), (2-27), (2-31), (2-32), (2-33), (2-39), (2-55), (2-57), (3-2), (3-3), (3-4), (3-8), (3-13), (4-3), (4-15), (4-21) and (4-31) are particularly preferred as a compound for the second component.

Compounds expressed by each of formulas (2) through (4) have a positive dielectric anisotropy and are superior in thermal and chemical stability. Thus, these compounds have an important role in case of preparing a LC composition for an AM-LCD in which the LC material is required to have superior characteristics such as a high voltage holding ratio and a high specific resistance.

Among these compounds, those having two six-membered rings are used with a primary aim of adjusting a driving voltage and/or a viscosity of the resulting composition. Those having three six-membered rings are used with a primary aim of adjusting a clearing point and a nematic range, driving voltage, a Δn and/or a viscosity of the resulting composition. Those having four six-membered rings are used with a chief aim of adjusting a clearing point and a nematic range of the composition.

As a compound expressed by each of formulas (5) through (7), compounds expressed by each of the following formulas are preferably employed in the present invention.

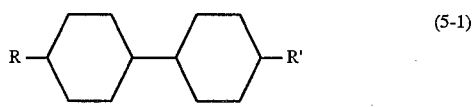

In these formulas R and R' represent independently an alkyl group of 1 to 10 carbon atoms.

Among these compounds, those expressed by each of formulas (5-1), (5-3), (5-5), (6-1), (6-2), (7-1), (7-2) and (7-3) are particularly preferred in the present invention.

A compound expressed by general formula (5) is a dielectric-anisotropically negative or weakly positive compound having two six-membered rings, and is used with a primary aim of reducing a viscosity of the resulting composition and/or of adjusting a Δn thereof.

A compound expressed by general formula (6) or general formula (7) is a dielectric-anisotropically negative or weakly positive compound having three six-membered rings, and is used with a primary aim of extending a nematic range by elevating a clearing point of the resulting composition and/or of adjusting a Δn thereof.

A preferable mixing proportion of the first component is 3–30% based upon the total weight of the composition. A more preferable mixing proportion of the first component is 3–20% based thereupon. When the mixing proportion of the first component is less than 3%, an effect of elevating a clearing point is often unavailable which effect is one of the objects of the present invention. When the mixing proportion of the first component exceeds 30%, a viscosity of the resulting composition often increases.

A mixing proportion of the second component is preferably 50–97% based upon the total weight of the composition, and is more preferably 60–97% based thereupon. It is most preferable that a mixing proportion of the second component is 70–97% based thereupon. When the mixing proportion of the second component is less than 50%, it is probable that a nematic range of the resulting composition is reduced. When the mixing proportion of the second component exceeds 97%, an effect of elevating a clearing point is often unavailable.

When a present composition consists of the first and second components, it is particularly preferable that the first and second components are contained in 3–20% and 80–97%, respectively, based upon the total weight the composition.

When a compound of formulas (5) through (7) is employed in the present invention, a mixing proportion of the compound is preferably up to 40% based upon the total weight of the resulting composition. A more preferable mixing proportion of the compound of formulas (5) to (7) is up to 30% based thereupon.

In case when a composition of the present invention consists of the first, second and third components, it is particularly preferred that the composition contains 3–20% of the first component, 70–97% of the second component and up to 20% of the third component.

A LC composition of the present invention may contain other compounds than those expressed by each of the above mentioned formulas as far as the objects of the present invention are not affected.

A composition of the present invention may be prepared according to a method which is per se conventional. Namely, there is employed a normal method in which various component compounds are mixed together in predetermined mixing proportions followed by being heated to a temperature higher than their clearing points to effect a homogeneous mixture.

Further, a liquid crystal composition of the present invention may be modified by introducing thereto suitable additive compounds to be improved to fulfill an intended purpose. Such additive compounds are known by a skilled person and are described in detail in literatures and the like.

In most probable case there is added a chiral dopant which induces a helical structure of LC molecules to adjust a twist angle to a required value and to prevent a reverse domain from causing in a display cell.

Furthermore, the composition of the present invention may be used in a guest and host mode display device by addition of dichroic dyestuffs such as merocyanines, styryl derivatives, azo compounds, azomethines, azoxy compounds, quinophthalones, anthraquinones, tetrazine derivatives, etc.

It is also possible to use the liquid crystal composition of the present invention for NCAP prepared by microencapsulating nematic liquid crystals, or for polymer-dispersion type display device (PDLCD) including as a typical example of polymer net-work liquid crystal display device (PNLCD) having three-dimensional, reticulated polymers formed in liquid crystals. Besides, it is possible to use the present liquid crystal composition as a LC material for electrically controlled birefringence (ECB) mode display and a dynamic scattering (DS) mode display.

A particularly preferred embodiment of the present invention will be shown in the following items (a) through (e).

(a) A liquid crystal composition comprising:
  a first component consisting of at least one compound expressed by aforementioned formula (1) wherein $R^1$ is a methyl group, and
  a second component consisting of at least one compound selected from the group consisting of compounds expressed by each of aforementioned formulas (2-1), (2-2), (2-3), (2-4), (2-8), (2-9), (2-11), (2-15), (2-25), (2-27), (2-31), (2-32), (2-33), (2-39), (2-55), (2-57), (3-2), (3-3), (3-4), (3-8), (3-13), (4-3), (4-15), (4-21) and (4-31),
  the first and second components being contained in 3–30% and 60–97%, respectively, based upon the total weight of the composition.

(b) A liquid crystal composition as defined by the previous item (a), wherein the first and second components are contained in 3–20% and 70–97%, respectively, based upon the total weight of the composition.

(c) A liquid crystal composition comprising:
  a first component consisting of at least one compound expressed by aforementioned formula (1) wherein $R^1$ is a methyl group,
  a second component consisting of at least one compound selected from the group consisting of compounds expressed by each of aforementioned formulas (2-1), (2-2), (2-3), (2-4), (2-8), (2-9), (2-11), (2-15), (2-25), (2-27), (2-31), (2-32), (2-33), (2-39), (2-55), (2-57), (3-2), (3-3), (3-4), (3-8), (3-13), (4-3), (4-15), (4-21) and (4-31), and
  a third component consisting of at least one compound selected from the group consisting of compounds expressed by each of aforementioned formulas (5-1), (5-3), (5-5), (6-1), (6-2), (7-1), (7-2) and (7-3),
  the first, second and third components being contained in 3–30%, 60–97% and up to 30%, respectively, based upon the total weight of the composition.

(d) A liquid crystal composition as defined by the previous item (c), wherein the first, second and third components are contained in 3–20%, 70–97% and up to 20%, respectively, based upon the total weight of the composition.

(e) A liquid crystal display device employing a liquid crystal composition as defined in any one of above items (a) through (d).

EXAMPLES

The present invention will be described in detail by way of examples together with comparative examples, however, it is not construed to be limited to these examples.

Composition of mixtures is expressed in per cent by weight in these examples. A threshold voltage was determined from an applied voltage corresponding to that when a transmission is 10% of a saturated value thereof in electro-optical response. A voltage holding ratio was determined by an area method.

Comparative Example 1

There was prepared a liquid crystal composition which is disclosed in Japanese patent application laid-open No. Sho 58-219137 and consists of the following compounds.

$CH_3OCH_2$—⬡—◯—◯—⬡—$C_3H_7$     4.76%

$C_3H_7$—⬡—◯—CN     28.57%

$C_5H_{11}$—⬡—◯—CN     38.09%

$C_7H_{15}$—⬡—◯—CN     28.57%

A clearing point of this composition was 61.0° C. A viscosity and a threshold voltage of the composition each at 20° C. were 25.0 Mpa·s and 1.62 V, respectively. A voltage holding ratio was 95.1%.

Comparative Example 2

A liquid crystal composition consisting of the following compounds was prepared.

$C_2H_5$—⬡—⬡—◯(F,F)     16.7%

$C_3H_7$—⬡—⬡—◯(F,F)     16.7%

$C_5H_{11}$—⬡—⬡—◯(F,F)     16.6%

$C_2H_5$—⬡—$CH_2CH_2$—⬡—◯(F,F)     10%

$C_3H_7$—⬡—$CH_2CH_2$—⬡—◯(F,F)     5%

$C_5H_{11}$—⬡—$CH_2CH_2$—⬡—◯(F,F)     10%

$C_2H_5$—⬡—◯—◯(F,F)     6.3%

$C_3H_7$—⬡—◯—◯(F,F)     6.3%

$C_2H_{11}$—⬡—◯—◯(F,F)     12.4%

A clearing point of this composition was 100.2° C. A viscosity of the composition was 25.3 Mpa·s at 20° C. An optical anisotropy was 0.093 at 25° C. A threshold voltage at 20° C. was 2.20 V, and a voltage holding ratio was 98.3%.

Example 1

A liquid crystal composition (85 parts by weight) prepared in comparative example 2 was mixed with a LC mixture (15 parts by weight) consisting of the following three compounds to prepare a LC composition (100 parts by weight).

$CH_3OCH_2$—⬡—◯—◯—⬡—$C_3H_7$     7%

$CH_3OCH_2$—⬡—◯—◯—⬡—$C_4H_9$     5%

$CH_3OCH_2$—⬡—◯—◯—⬡—$C_5H_{11}$     3%

A clearing point of the composition was 133.7° C. A viscosity and a threshold valtage of the composition each at 20° C. were 33.7 mPa·s and 2.55 V, respectively. An optical anisotropy and a voltage holding ratio each at 25° C. were 0.105 and 98.5%, respectively.

Comparing this composition with that prepared in comparative example 1, a clearing point and a voltage holding ratio of the composition are higher in this example than in the comparative example. Further, a clearing point of the composition is elevated from that of the comparative example 2.

Example 2

A liquid crystal composition consisting of $CH_3OCH_2$—⬡—◯—◯—⬡—$C_3H_7$     7%

$CH_3OCH_2$—⬡—◯—◯—⬡—$C_4H_9$     7%

-continued
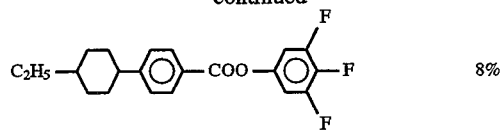
was prepared. A clearing point of the composition was 117.2° C. A viscosity at 20° C., an optical anisotropy at 25° C., a threshold voltage at 20° C. of the composition were 36.8 mPa·s, 0.098 and 1.78 V, respectively. A voltage holding ratio at 25° C. was 98.3%.
Example 3
A liquid crystal composition consisting of
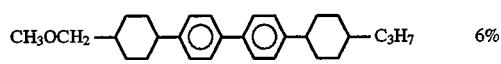
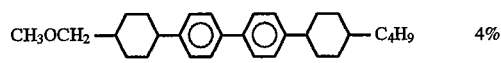
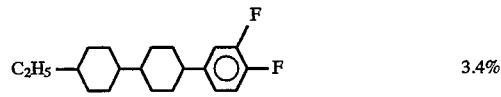
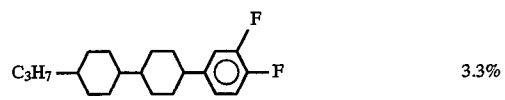
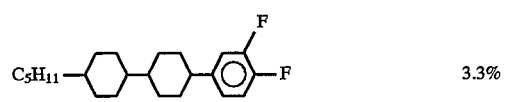
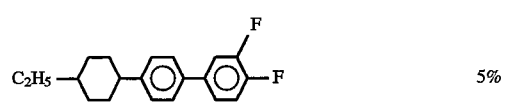
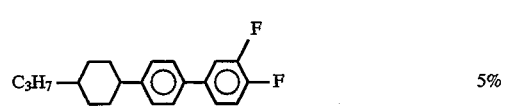
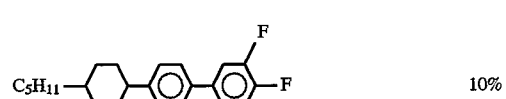
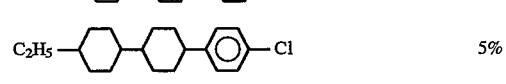
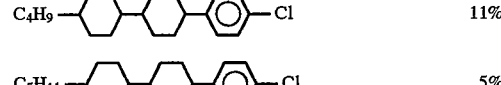
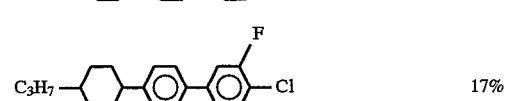
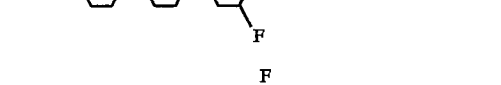
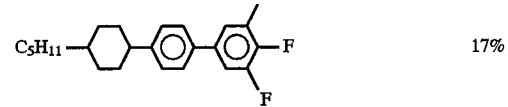
and -continued

C₃H₇—⬡—CH₂CH₂—⌬(F,F,F)    5% was prepared. A clearing point of the composition was 123.2° C. A viscosity at 20° C., an optical anisotropy at 25° C., a threshold voltage at 20° C. of the composition were 32.0 mPa·s, 0.131 and 2.19 V, respectively. A voltage holding ratio at 25° C. was 98.0%.

Example 4

A liquid crystal composition consisting of

CH₃OCH₂—⬡—⌬—⌬—⬡—C₃H₇    4%

CH₃OCH₂—⬡—⌬—⌬—⬡—C₅H₁₁    4%

C₂H₅—⬡—⬡—⌬(F,F)    8%

C₃H₇—⬡—⬡—⌬(F,F)    8%

C₅H₁₁—⬡—⬡—⌬(F,F)    8%

C₂H₅—⬡—CH₂CH₂—⬡—⌬(F,F)    10%

C₃H₇—⬡—CH₂CH₂—⬡—⌬(F,F)    5%

C₅H₁₁—⬡—CH₂CH₂—⬡—⌬(F,F)    10%

C₂H₅—⬡—⬡—⌬(F,F,F)    8%

C₃H₇—⬡—⬡—⌬(F,F,F)    8%

C₃H₇—⬡—⌬—⌬(F,F,F)    5%

-continued

C₃H₇—⬡—⬡—COO—⌬(F,F,F)    6%

C₃H₇—⬡—⬡—⌬—Cl    5%

C₃H₇—⬡—⬡—COO—⌬—F    3%

C₅H₁₁—⬡—⬡—COO—⌬—F    3%

C₃H₇—⬡—⌬—COO—⌬—F    3% and

C₃H₇—⬡—⬡—⌬—F    2% was prepared. A clearing point of the composition was 124.6° C. A viscosity at 20° C., an optical anisotropy at 25° C., a threshold voltage at 20° C. of the composition were 30.4 mPa·s, 0.091 and 2.24 V, respectively. A voltage holding ratio at 25° C. was 98.5%.

Example 5

A liquid crystal composition consisting of

CH₃OCH₂—⬡—⌬—⌬—⬡—C₃H₇    8%

CH₃OCH₂—⬡—⌬—⌬—⬡—C₄H₉    7%

CH₃OCH₂—⬡—⌬—⌬—⬡—C₅H₁₁    5%

C₅H₁₁—⬡—CH₂CH₂—⌬(F,F)    15%

C₂H₅—⬡—⬡—⌬(F,F)    11%

C₃H₇—⬡—⬡—⌬(F,F)    11%

C₅H₁₁—⬡—⬡—⌬(F,F)    11%

C₂H₅—⬡—CH₂CH₂—⬡—⌬(F,F)    6.4%

C₃H₇—⬡—CH₂CH₂—⬡—⌬(F,F)    3.2%

-continued

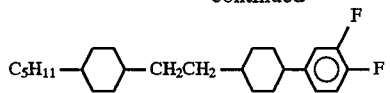 6.4%

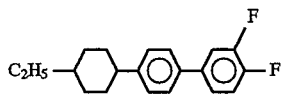 4%

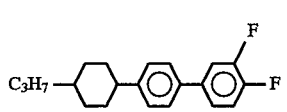 4% and

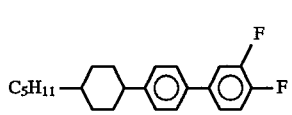 8% was prepared. A clearing point of the composition was 116.5° C. A viscosity at 20° C., an optical anisotropy at 25° C., a threshold voltage at 20° C. of the composition were 27.1 mPa·s, 0.101 and 2.56 V, respectively. A voltage holding ratio at 25° C. was 98.8%.

Example 6

A liquid crystal composition consisting of

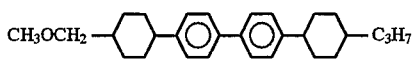 4%

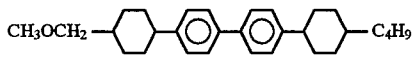 5%

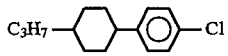 3%

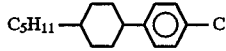 3%

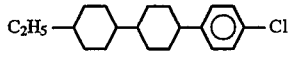 8%

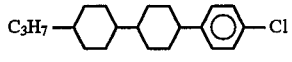 5%

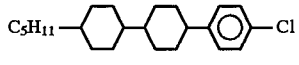 4%

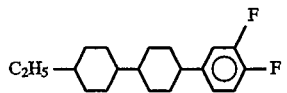 6.7%

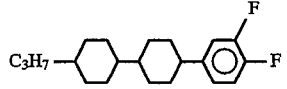 6.7%

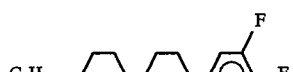 6.6%

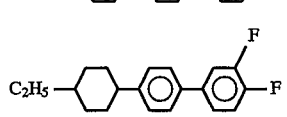 5%

-continued

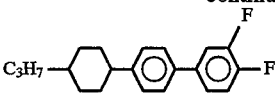 5%

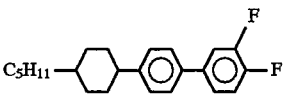 10%

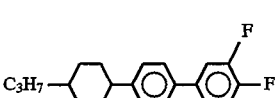 15%

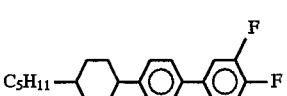 10% and

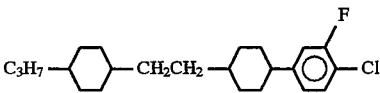 3% was prepared. A clearing point of the composition was 117.0° C. A viscosity at 20° C., an optical anisotropy at 25° C., a threshold voltage at 20° C. of the composition were 27.7 mPa·s, 0.123 and 2.24 V, respectively. A voltage holding ratio at 25° C. was 98.6%.

Example 7

A liquid crystal composition consisting of

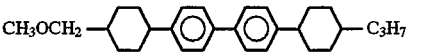 7%

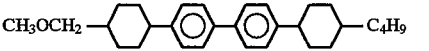 5%

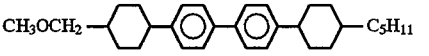 3%

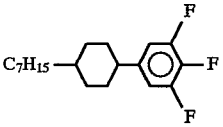 3%

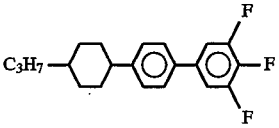 5%

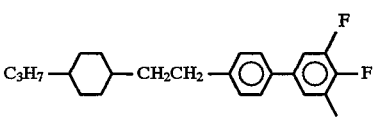 3%

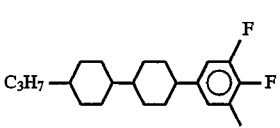 10%

-continued

| Structure | % |
|---|---|
| C₅H₁₁—[Cy]—[Cy]—[Ph(F,F,F)] | 10% |
| C₃H₇—[Cy]—[Cy]—CH₂CH₂—[Ph(F,F,F)] | 10% |
| C₅H₁₁—[Cy]—[Cy]—CH₂CH₂—[Ph(F,F,F)] | 10% |
| C₃H₇—[Cy]—CH₂CH₂—[Cy]—[Ph(F,F,F)] | 8% |
| C₅H₁₁—[Cy]—CH₂CH₂—[Cy]—[Ph(F,F,F)] | 10% |
| C₃H₇—[Cy]—[Cy]—COO—[Ph(F,F,F)] | 10% |
| C₄H₉—[Cy]—[Cy]—COO—[Ph(F,F,F)] | 3% | and

| Structure | % |
|---|---|
| C₅H₁₁—[Cy]—[Cy]—COO—[Ph(F,F,F)] | 3% | was prepared. A clearing point of the composition was 117.1° C. A viscosity at 20° C., an optical anisotropy at 25° C., a threshold voltage at 20° C. of the composition were 30.4 mPa·s, 0.093 and 1.98 V, respectively. A voltage holding ratio at 25° C. was 98.5%.

Example 8

A liquid crystal composition consisting of

| Structure | % |
|---|---|
| CH₃OCH₂—[Cy]—[Ph]—[Cy]—C₃H₇ | 4% |
| CH₃OCH₂—[Cy]—[Ph]—[Ph]—C₄H₉ | 3% |
| C₃H₇—[Cy]—COO—[Ph]—F | 3% |

-continued

| Structure | % |
|---|---|
| C₇H₁₅—[Ph(F,F)] | 3% |
| C₂H₅—[Cy]—[Ph(F,F)] | 11.7% |
| C₃H₇—[Cy]—[Ph(F,F)] | 11.7% |
| C₅H₁₁—[Cy]—[Ph(F,F)] | 11.6% |
| C₂H₅—[Cy]—CH₂CH₂—[Cy]—[Ph(F,F)] | 4% |
| C₃H₇—[Cy]—CH₂CH₂—[Cy]—[Ph(F,F)] | 2% |
| C₅H₁₁—[Cy]—CH₂CH₂—[Cy]—[Ph(F,F)] | 4% |
| C₂H₅—[Cy]—[Ph]—[Ph(F,F)] | 5% |
| C₃H₇—[Cy]—[Ph]—[Ph(F,F)] | 5% |
| C₅H₁₁—[Cy]—[Ph]—[Ph(F,F)] | 10% |
| C₃H₇—[Cy]—[Ph]—[Ph]—F | 5% |
| C₃H₇—[Cy]—[Cy]—[Ph]—F | 5% |
| C₃H₇—[Cy]—[Cy]—COO—[Ph(F,F,F)] | 6% | and

| Structure | % |
|---|---|
| C₅H₁₁—[Cy]—[Cy]—COO—[Ph(F,F,F)] | 6% | was prepared. A clearing point of the composition was 113.8° C. A viscosity at 20° C., an optical anisotropy at 25° C., a threshold voltage at 20° C. of the composition were 25.4 mPa·s, 0.100 and 2.26 V, respectively. A voltage holding ratio at 25° C. was 98.6%.

Example 9

A liquid crystal composition consisting of

| Compound | % |
|---|---|
| CH₃OCH₂–⟨H⟩–⟨Ph⟩–⟨H⟩–C₃H₇ | 6% |
| CH₃OCH₂–⟨H⟩–⟨Ph⟩–⟨H⟩–C₅H₁₁ | 5% |
| C₅H₁₁–⟨H⟩–CH₂CH₂–⟨Ph(3,4-F₂)⟩ | 8% |
| C₂H₅–⟨H⟩–⟨Ph(3,4-F₂)⟩ | 11.7% |
| C₃H₇–⟨H⟩–⟨Ph(3,4-F₂)⟩ | 11.7% |
| C₅H₁₁–⟨H⟩–⟨H⟩–⟨Ph(3,4-F₂)⟩ | 11.6% |
| C₂H₅–⟨H⟩–⟨Ph⟩–⟨Ph(3,4-F₂)⟩ | 5% |
| C₃H₇–⟨H⟩–⟨Ph⟩–⟨Ph(3,4-F₂)⟩ | 5% |
| C₅H₁₁–⟨H⟩–⟨Ph⟩–⟨Ph(3,4-F₂)⟩ | 10% |
| C₃H₇–⟨H⟩–⟨H⟩–⟨Ph-F⟩ | 5% |
| C₃H₇–⟨H⟩–⟨H⟩–COO–⟨Ph(3,4,5-F₃)⟩ | 10% |
| C₃H₇–⟨H⟩–⟨H⟩–CH₂CH₂–⟨Ph(3,4,5-F₃)⟩ | 7% |
| C₂H₅–⟨H⟩–⟨H⟩–⟨Ph(3,4,5-F₃)⟩ | 2% | and

| Compound | % |
|---|---|
| C₃H₇–⟨H⟩–⟨H⟩–CH₂CH₂–⟨Ph(3,4,5-F₃)⟩ | 2% | was prepared. A clearing point of the composition was 119.3° C. A viscosity at 20° C., an optical anisotropy at 25° C., a threshold voltage at 20° C. of the composition were 26.5 mPa·s, 0.104 and 2.28 V, respectively. A voltage holding ratio at 25° C. was 98.4%.

Example 10

A liquid crystal composition consisting of

| Compound | % |
|---|---|
| CH₃OCH₂–⟨H⟩–⟨Ph⟩–⟨H⟩–C₄H₉ | 5% |
| CH₃OCH₂–⟨H⟩–⟨Ph⟩–⟨H⟩–C₅H₁₁ | 6% |
| C₇H₁₅–⟨H⟩–⟨Ph(3-F)⟩ | 4% |
| C₃H₇–⟨H⟩–⟨Ph⟩–Cl | 6% |
| C₂H₅–⟨H⟩–⟨Ph⟩–⟨Ph(3-F)⟩ | 7.5% |
| C₃H₇–⟨H⟩–⟨Ph⟩–⟨Ph(3-F)⟩ | 7.5% |
| C₅H₁₁–⟨H⟩–⟨Ph⟩–⟨Ph(3-F)⟩ | 15% |
| C₂H₅–⟨H⟩–⟨H⟩–⟨Ph⟩–Cl | 5% |
| C₄H₉–⟨H⟩–⟨H⟩–⟨Ph⟩–Cl | 10% |
| C₅H₁₁–⟨H⟩–⟨H⟩–⟨Ph⟩–Cl | 5% |
| C₃H₇–⟨H⟩–⟨H⟩–CH₂CH₂–⟨Ph(3,4,5-F₃)⟩ | 10% |
| C₃H₇–⟨H⟩–⟨Ph⟩–⟨Ph(3,4-F₂)⟩ | 10% |
| C₅H₁₁–⟨H⟩–⟨Ph(3,4,5-F₃)⟩ | 5% | and

| Compound | % |
|---|---|
| C₃H₇–⟨H⟩–⟨H⟩–COO–⟨Ph⟩–⟨Ph⟩–F | 4% | was prepared. A clearing point of the composition was 124.7° C. A viscosity at 20° C., an optical anisotropy at 25° C., a threshold voltage at 20° C. of the composition were 28.7 mPa·s, 0.127 and 2.38 V, respectively. A voltage holding ratio at 25° C. was 98.6%.

Example 11
A liquid crystal composition consisting of
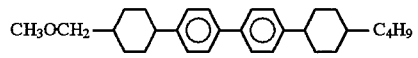 4%
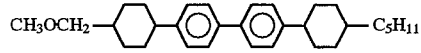 4%
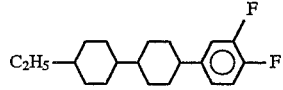 9.3%
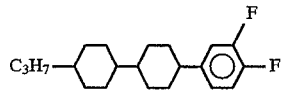 9.3%
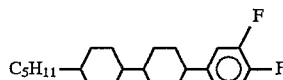 9.4%
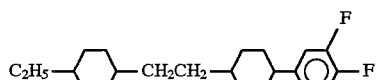 10.8%
 5.4%
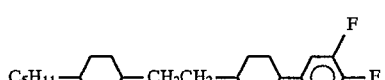 10.8%
 2.5%
 2.5%
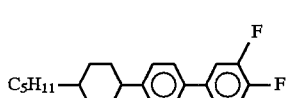 5%
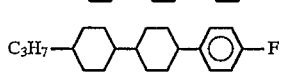 4%
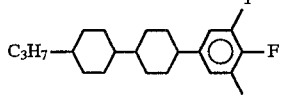 4%
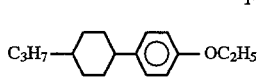 6%
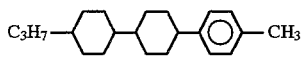 6%
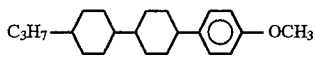 3%
and
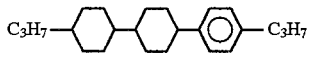 4%
was prepared. A clearing point of the composition was 125.4° C. A viscosity at 20° C., an optical anisotropy at 25° C., a threshold voltage at 20° C. of the composition were 26.4 mPa·s, 0.095 and 2.83 V, respectively. A voltage holding ratio at 25° C. was 98.8%.
Example 12
A liquid crystal composition consisting of
 5%
 5%
 7%
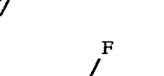 7.7%
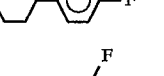 7.7%
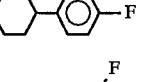 7.6%
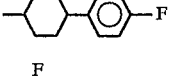 8%
 4%
 8%
 5%
 5%
 6%
 3%

-continued

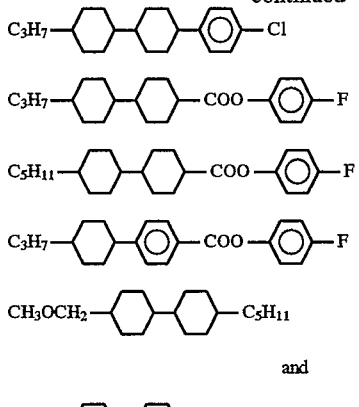

| | |
|---|---|
| C₃H₇—⬡—⬡—⌬—Cl | 5% |
| C₃H₇—⬡—⬡—COO—⌬—F | 3% |
| C₅H₁₁—⬡—⬡—COO—⌬—F | 3% |
| C₃H₇—⬡—⌬—COO—⌬—F | 3% |
| CH₃OCH₂—⬡—⬡—C₅H₁₁ | 4% |
| and | |
| C₃H₇—⬡—⬡—C₅H₁₁ | 3% | was prepared. A clearing point of the composition was 115.6° C. A viscosity at 20° C., an optical anisotropy at 25° C., a threshold voltage at 20° C. of the composition were 25.5 mPa·s, 0.088 and 2.27 V, respectively. A voltage holding ratio at 25° C. was 98.9%.

Example 13

A liquid crystal composition consisting of

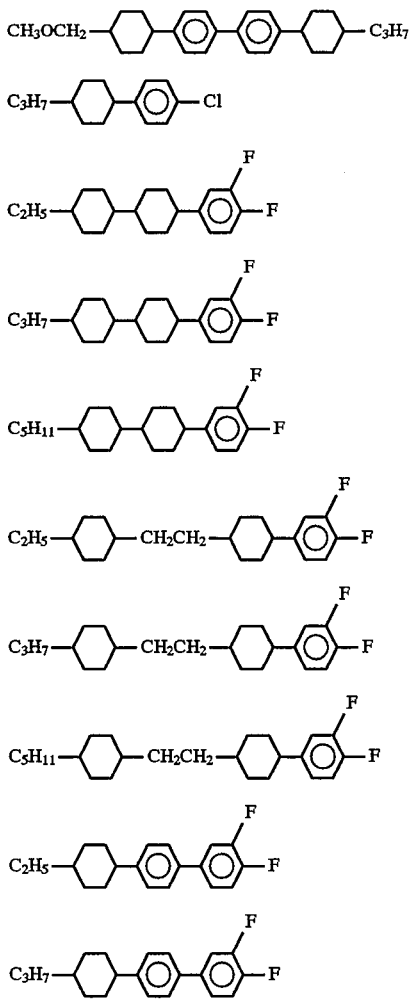

| | |
|---|---|
| CH₃OCH₂—⬡—⌬—⌬—⬡—C₃H₇ | 3% |
| C₃H₇—⬡—⌬—Cl | 5% |
| C₂H₅—⬡—⬡—⌬(F,F) | 13.3% |
| C₃H₇—⬡—⬡—⌬(F,F) | 13.3% |
| C₅H₁₁—⬡—⬡—⌬(F,F) | 13.4% |
| C₂H₅—⬡—CH₂CH₂—⬡—⌬(F,F) | 2% |
| C₃H₇—⬡—CH₂CH₂—⬡—⌬(F,F) | 1% |
| C₅H₁₁—⬡—CH₂CH₂—⬡—⌬(F,F) | 2% |
| C₂H₅—⬡—⌬—⌬(F,F) | 3.8% |
| C₃H₇—⬡—⌬—⌬(F,F) | 3.8% |

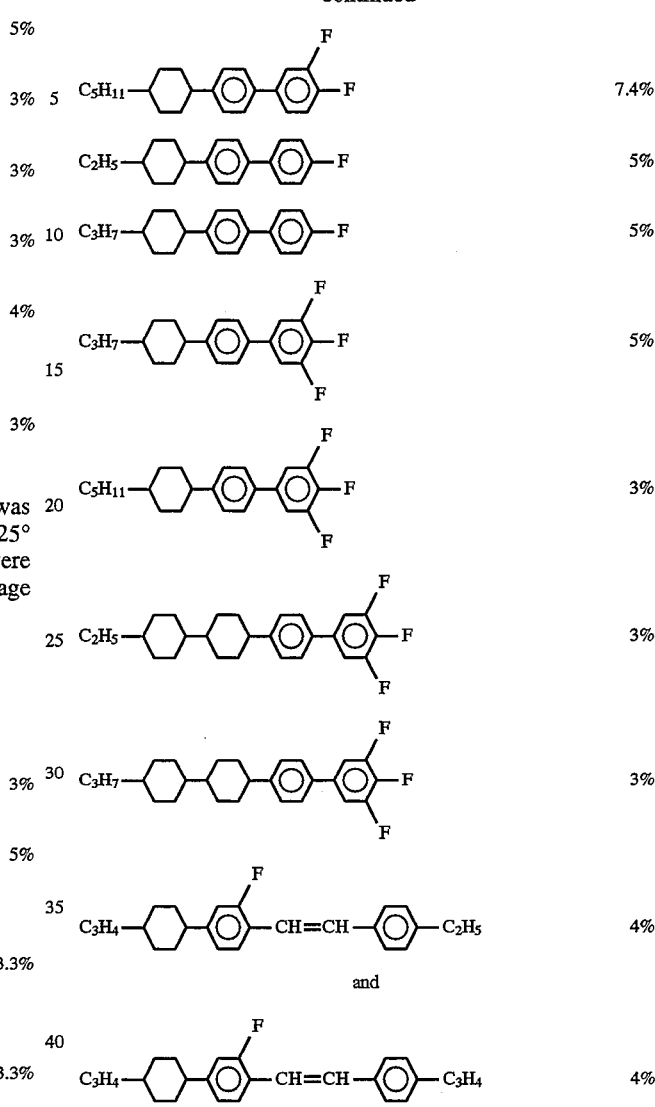

| | |
|---|---|
| C₅H₁₁—⬡—⌬—⌬(F,F) | 7.4% |
| C₂H₅—⬡—⌬—⌬—F | 5% |
| C₃H₇—⬡—⌬—⌬—F | 5% |
| C₃H₇—⬡—⌬—⌬(F,F,F) | 5% |
| C₅H₁₁—⬡—⌬—⌬(F,F,F,F) | 3% |
| C₂H₅—⬡—⌬—⌬—⌬(F,F,F) | 3% |
| C₃H₇—⬡—⬡—⌬—⌬(F,F,F) | 3% |
| C₃H₄—⬡—⌬(F)—CH=CH—⌬—C₂H₅ | 4% |
| and | |
| C₃H₄—⬡—⌬(F)—CH=CH—⌬—C₃H₄ | 4% | was prepared. A clearing point of the composition was 118.3° C. A viscosity at 20° C., an optical anisotropy at 25° C., a threshold voltage at 20° C. of the composition were 26.8 mPa·s, 0.123 and 2.33 V, respectively. A voltage holding ratio at 25° C. was 98.7%.

Example 14

A liquid crystal composition consisting of

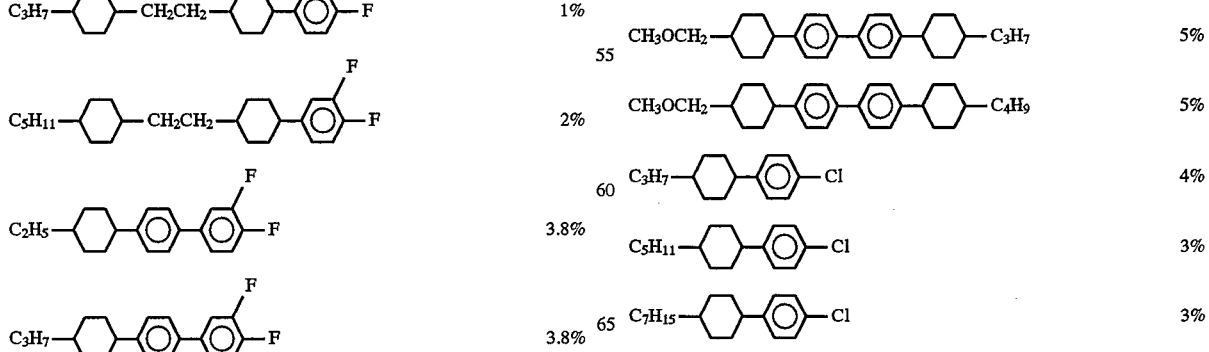

| | |
|---|---|
| CH₃OCH₂—⬡—⌬—⌬—⬡—C₃H₇ | 5% |
| CH₃OCH₂—⬡—⌬—⌬—⬡—C₄H₉ | 5% |
| C₃H₇—⬡—⌬—Cl | 4% |
| C₅H₁₁—⬡—⌬—Cl | 3% |
| C₇H₁₅—⬡—⌬—Cl | 3% |

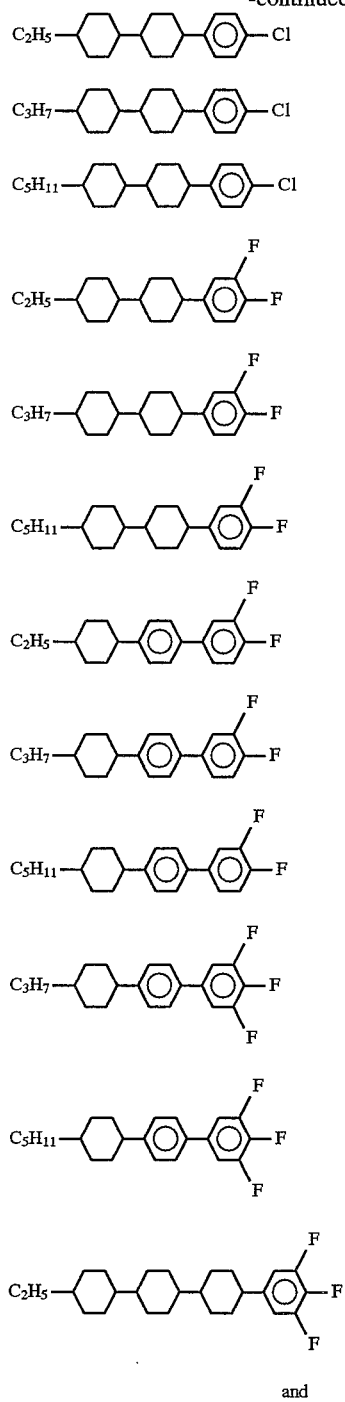
was prepared. A clearing point of the composition was 123.4° C. A viscosity at 20° C., an optical anisotropy at 25° C., a threshold voltage at 20° C. of the composition were 27.3 mPa·s, 0.133 and 2.36 V, respectively. A voltage holding ratio at 25° C. was 97.8%.
Example 15
A liquid crystal composition consisting of -continued

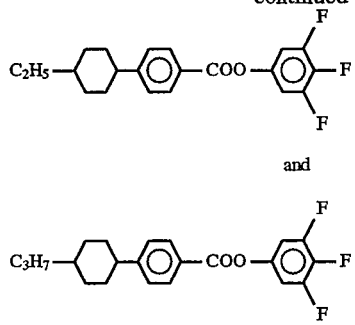

3% and

3% was prepared. A clearing point of the composition was 103.7° C. A viscosity at 20° C., an optical anisotropy at 25° C., a threshold voltage at 20° C. of the composition were 31.3 mPa·s, 0.074 and 1.69 V, respectively. A voltage holding ratio at 25° C. was 98.3%.

Effect of the Invention

As disclosed by the above mentioned examples and comparative examples, there is provided by the present invention a liquid crystal composition which exhibits a high voltage holding ratio and also has a wide nematic range (particularly a high clearing point). Further, this liquid crystal composition enables an AM-LCD which can be employed for motorcars and for outdoor-use.

What is claimed is:

1. A liquid crystal composition comprising:
a first component consisting of at least one member selected from the group of compounds expressed by formula (1):

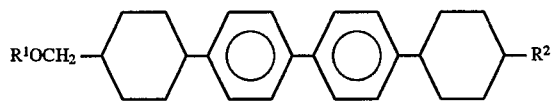
(1)

wherein $R^1$ and $R^2$ represent independently an alkyl group of 1 to 10 carbon atoms, and
a second component consisting of one or more members selected from the group of compounds expressed by formula (2), formula (3) or formula (4):

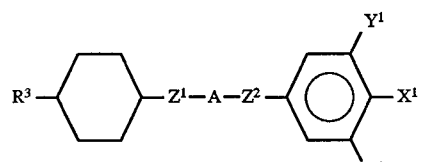
(2)

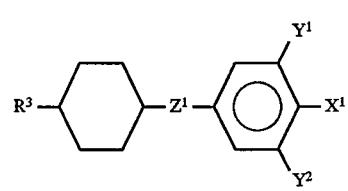
(3)

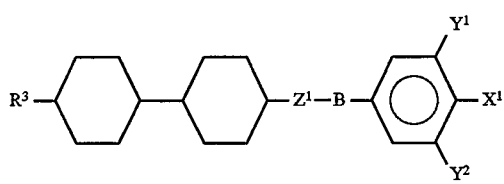
(4)

wherein $R^3$ represents an alkyl group of 1 to 10 carbon atoms; $X^1$ represents F or Cl; $Y^1$ and $Y^2$ represent independently H or F; $Z^1$ and $Z^2$ represent independently a single bond, —$CH_2CH_2$— or —COO—; A and B represent independently a trans-1,4-cyclohexylene or 1,4-phenylene.

2. A liquid crystal composition according to claim 1, wherein said second component consists of one or more compounds expressed by said formula (2).

3. A liquid crystal composition according to claim 1, wherein said second component consists of at least one compound expressed by said formula (2) and at least one compound expressed by said formula (3).

4. A liquid crystal composition according to claim 1, wherein said second component consists of at least one compound expressed by said formula (2), at least one compound expressed by said formula (3) and at least one compound expressed by said formula (4).

5. A liquid crystal composition according to claim 1, wherein mixing proportions of said first and second components are 3–30% and 50–97%, respectively, based upon the total weight of said composition.

6. A liquid crystal composition according to claim 2, wherein mixing proportions of said first and second components are 3–30% and 50–97%, respectively, based upon the total weight of said composition.

7. A liquid crystal composition according to claim 3, wherein mixing proportions of said first and second components are 3–30% and 50–97%, respectively, based upon the total weight of said composition.

8. A liquid crystal composition according to claim 4, wherein mixing proportions of said first and second components are 3–30% and 50–97%, respectively, based upon the total weight of said composition.

9. A liquid crystal composition according to claim 1, further comprising a third component consisting of one or more members selected from the group of compounds expressed by formula (5), formula (6) or formula (7):

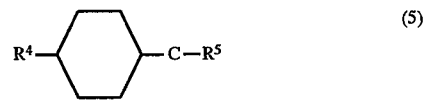
(5)

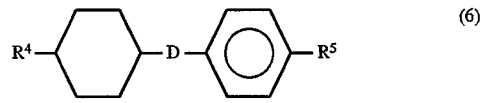
(6)

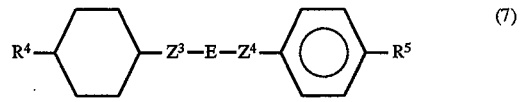
(7)

wherein $R^4$ and $R^5$ represent independently an alkyl group, an alkoxy group or an oxalykyl group each having 1 to 10 carbon atoms; $Z^3$ represents —$CH_2CH_2$— or a single bond; $Z^4$ represents —CH=CH— or —C≡C—; E represents 1,4-phenylene in which one hydrogen atom on any of the lateral positions may be replaced by F; and C and D represent trans-1,4-cyclohexylene or 1,4-phenylene.

10. A liquid crystal composition according to claim 2, further comprising a third component consisting of one or more members selected from the group of compounds expressed by formula (5), formula (6) or formula (7):

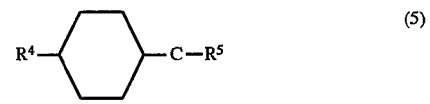
(5)

-continued

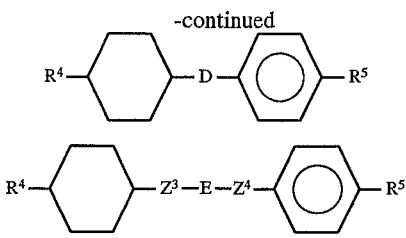

wherein $R^4$ and $R^5$ represent independently an alkyl group, an alkoxy group or an oxalkyl group each having 1 to 10 carbon atoms; $Z^3$ represents —$CH_2CH_2$— or a single bond; $Z^4$ represents —CH=CH— or —C≡C—; E represents 1,4-phenylene in which one hydrogen atom on any of the lateral positions may be replaced by F; and C and D represent trans-1,4-cyclohexylene or 1,4-phenylene.

11. A liquid crystal composition according to claim 3, further comprising a third component consisting of one or more members selected from the group of compounds expressed by formula (5), formula (6) or formula (7):

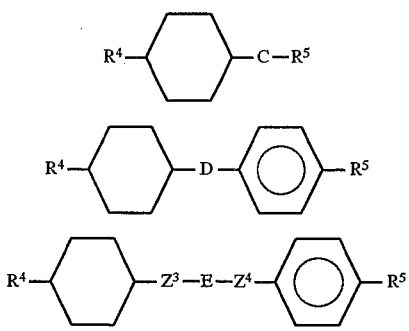

wherein $R^4$ and $R^5$ represent independently an alkyl group, an alkoxy group or an oxalkyl group each having 1 to 10 carbon atoms; $Z^3$ represents —$CH_2CH_2$— or a single bond; $Z^4$ represents —CH=CH— or —C≡C—; E represents 1,4-phenylene in which one hydrogen atom on any of the lateral positions may be replaced by F; and C and D represent trans-1,4-cyclohexylene or 1,4-phenylene.

12. A liquid crystal composition according to claim 4, further comprising a third component consisting of one or more members selected from the group of compounds expressed by formula (5), formula (6) or formula (7):

wherein $R^4$ and $R^5$ represent independently an alkyl group, an alkoxy group or an oxalykyl group each having 1 to 10 carbon atoms; $Z^3$ represents —$CH_2CH$— or a single bond; $Z^4$ represents —CH=CH— or —C≡C—; E represents 1,4-phenylene in which one hydrogen atom on any of the lateral positions may be replaced by F; and C and D represent trans-1,4-cyclohexylene or 1,4-phenylene.

13. A liquid crystal composition according to claim 9, wherein mixing proportions of said first, second and third components are 3–30%, 50–97% and up to 40%, respectively, based upon the total weight of said composition.

14. A liquid crystal composition according to claim 10, wherein mixing proportions of said first, second and third components are 3–30%, 50–97% and up to 40%, respectively, based upon the total weight of said composition.

15. A liquid crystal composition according to claim 11, wherein mixing proportions of said first, second and third components are 3–30%, 50–97% and up to 40%, respectively, based upon the total weight of said composition.

16. A liquid crystal composition according to claim 12, wherein mixing proportions of said first, second and third components are 3–30%, 50–97% and up to 40%, respectively, based upon the total weight of said composition.

17. A liquid crystal display device comprising a liquid crystal composition as defined by any claim of claims 1 to 16.

* * * * *